(12) United States Patent
Hochstetler et al.

(10) Patent No.: US 10,707,727 B2
(45) Date of Patent: Jul. 7, 2020

(54) MAIN GENERATOR STATOR SLEEVE FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 108 days.

(21) Appl. No.: 15/862,253

(22) Filed: Jan. 4, 2018

(65) Prior Publication Data

US 2019/0207482 A1  Jul. 4, 2019

(51) Int. Cl.
| *H02K 5/20* | (2006.01) |
| *H02K 7/116* | (2006.01) |
| *H02K 9/19* | (2006.01) |
| *H02K 9/197* | (2006.01) |
| *H02K 15/00* | (2006.01) |

(52) U.S. Cl.
CPC .............. *H02K 9/197* (2013.01); *H02K 5/20* (2013.01); *H02K 7/116* (2013.01); *H02K 9/19* (2013.01); *H02K 15/0006* (2013.01); *H02K 2213/03* (2013.01)

(58) Field of Classification Search
CPC .... H02K 9/197; H02K 7/116; H02K 15/0006; H02K 2213/03; H02K 9/19; H02K 5/20

USPC ........................................................ 310/54
See application file for complete search history.

(56) References Cited

U.S. PATENT DOCUMENTS

| 2008/0024020 | A1* | 1/2008 | Iund ................. | H02K 5/20 310/61 |
| 2015/0381010 | A1* | 12/2015 | Kobes ............... | H02K 5/20 310/54 |
| 2017/0067461 | A1* | 3/2017 | Wojcik ............. | F04C 2/344 |
| 2019/0207482 | A1* | 7/2019 | Hochstetler ...... | H02K 5/20 |

FOREIGN PATENT DOCUMENTS

| DE | 102013201758 | 8/2014 |
| DE | 102016110658 | 12/2017 |
| WO | 8700704 | 1/1987 |

OTHER PUBLICATIONS

The Extended European Search Report for EP Application No. 1915019.3, dated May 13, 2019.

* cited by examiner

*Primary Examiner* — John K Kim
(74) *Attorney, Agent, or Firm* — Carlson, Gaskey & Olds, P.C.

(57) ABSTRACT

A stator sleeve for use in an integrated drive generator has a body extending between a first end and a second end and has a generally cylindrical inner peripheral surface. An outer peripheral surface has a plurality of circumferentially extending ribs define intermediate oil cooling channels. An integrated drive generator and a method are also disclosed.

4 Claims, 4 Drawing Sheets

MAIN GENERATOR STATOR SLEEVE FOR INTEGRATED DRIVE GENERATOR

BACKGROUND

This application relates to a stator sleeve for a main drive generator in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

In addition, various accessory systems, such as various pumps, are driven by differential output ring gear through an accessory drive gear.

A main generator in an integrated drive generator has a stator with a stator sleeve that faces design challenges.

SUMMARY

A stator sleeve for use in an integrated drive generator has a body extending between a first end and a second end and has a generally cylindrical inner peripheral surface. An outer peripheral surface has a plurality of circumferentially extending ribs that define intermediate oil cooling channels.

An integrated drive generator and a method of replacing a stator sleeve in an integrated drive generator are also disclosed and claimed.

These and other features may be best understood from the following drawings and specification.

DETAILED DESCRIPTION

Figure 1:
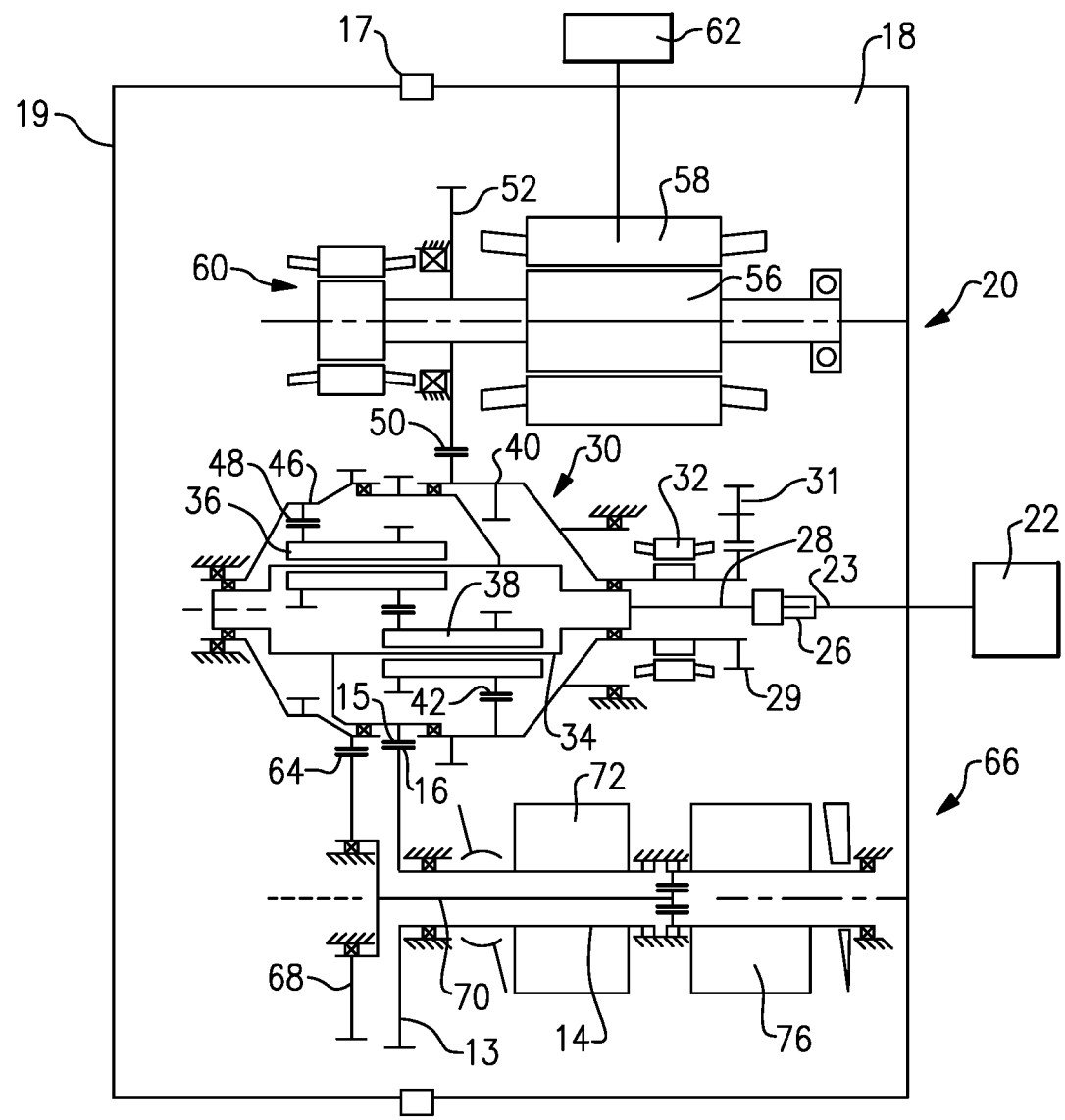
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

A gear 15 that is part of the carrier has a gear interface 16 with a gear 13 driving a shaft 14 also within the speed trimmer.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. The main generator stator has unique features as discussed below. A worker of ordinary skill would recognize that the desired frequency and speed at use 62 would dictate a number of design functions.

Figure 2A:
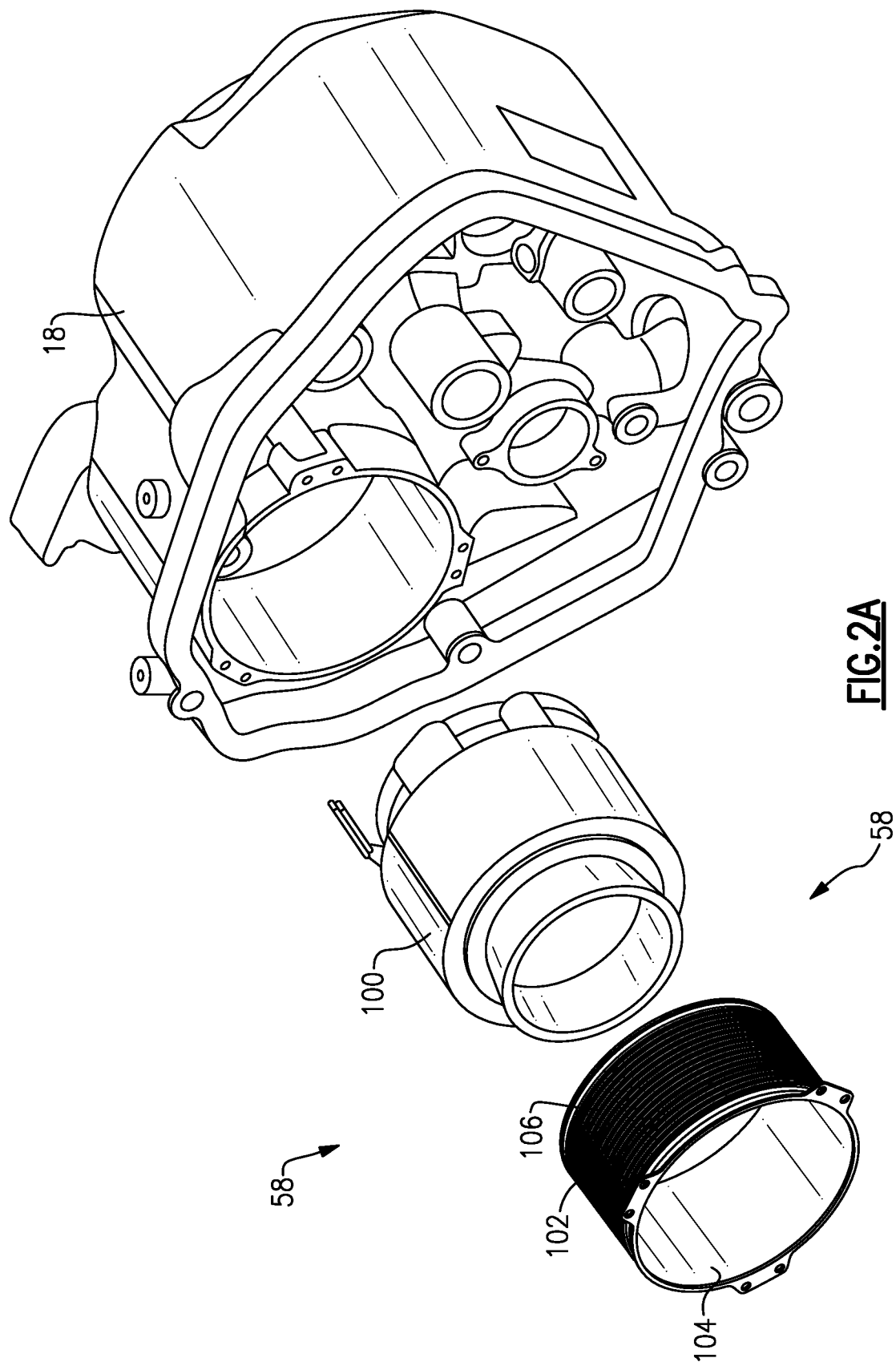
FIG. 2A is an exploded view of a main generator stator.

The main generator stator 58 is illustrated in FIG. 2A. The housing 18 receives a stator assembly, or stacked lamination 100 which has stator structure as is known. A stator sleeve 102 is unique to this application and includes an inner periphery 104 which is generally cylindrical. However, an outer periphery is provided with a plurality of oil cooling channels 106. Oil flows from housing 18 in channels 106 and is then returned to housing 18.

Sleeve 102 is press fit on an outer diameter of stacked lamination 100 and completely overlaps both ends of stacked laminations 100.

Figure 2B:
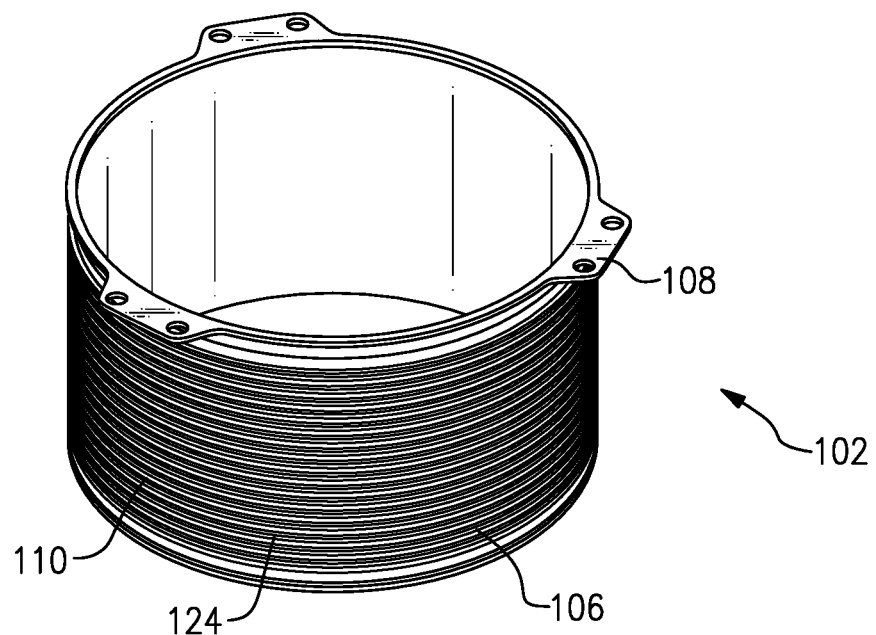
FIG. 2B is a detailed view of a stator sleeve.

FIG. 2B is a view of the stator sleeve 102. As shown, a body 110 includes the cooling channels 106 extending circumferentially.

Figure 2C:
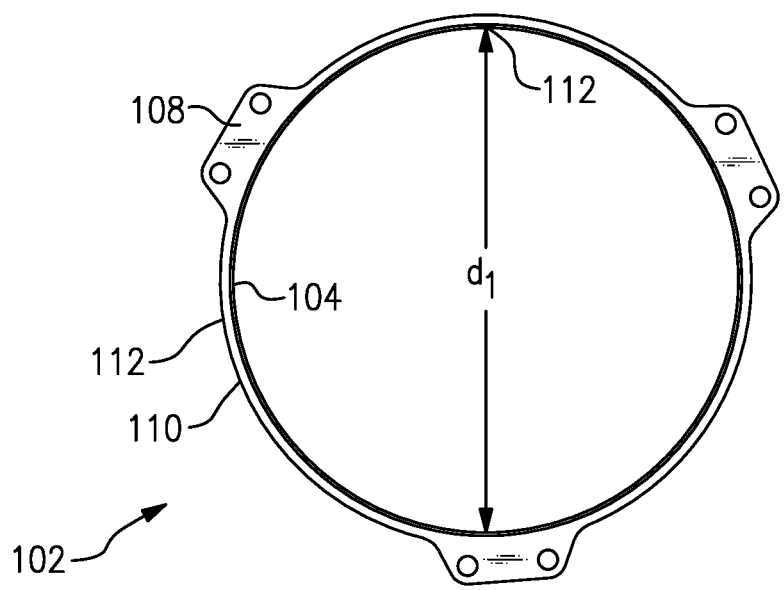
FIG. 2C is a front view.

FIG. 2C shows a detail. The cylindrical inner periphery 104 extends for an inner diameter $d_1$. In one embodiment, $d_1$ was 6.940 inches (17.627 cm).

The tabs 108 for securing the stator sleeve to a housing 18 are also illustrated in this figure.

Figure 2D:
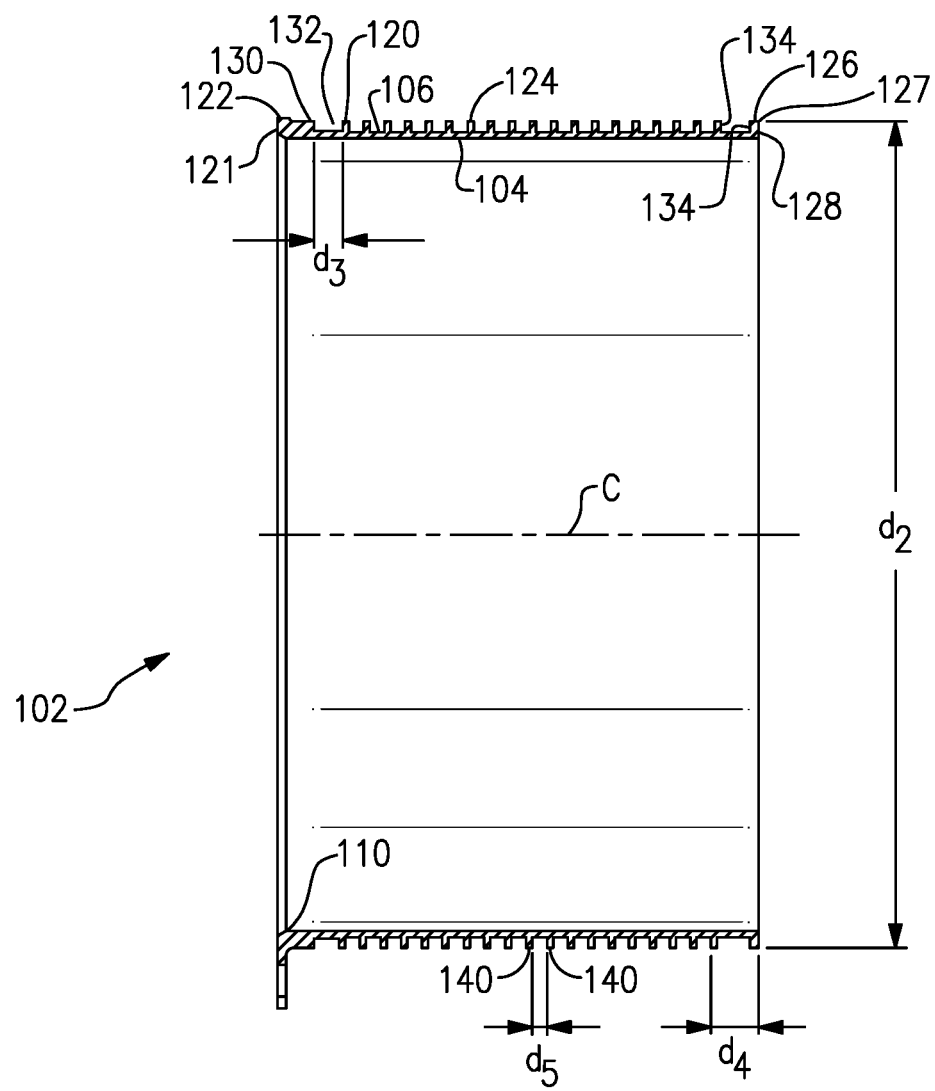
FIG. 2D is a cross-sectional view.

FIG. 2D shows further details of the body 110. As shown, the cooling grooves 106 are formed intermediate a plurality of ribs 120, 124, and 126. There are 19 ribs 120 and 124. An outer diameter, or second distance $d_2$ is defined to a radially outer point 127 on ribs 126. In one embodiment, $d_2$ is 7.218 inches (18.33 centimeters). An end flange 122 is formed at one end 121 and the body 110 extends to a second end 128. Inner facing surfaces 130 and 132 of the end flange 122 and a rib 120 adjacent flange 122 are separated by a distance $d_3$ measured along a center axis C.

In one embodiment, $d_3$ was 0.250 inches (0.64 centimeters). An opposed end rib 126 is formed at a second end 128 of the body 110. Inner facing surface 134 of an intermediate rib 124 most adjacent to the end rib 126 and an inner facing surface 134 on the end rib 126 are spaced by a distance $d_4$. In embodiments, $d_4$ is 0.394 inches (1.00 centimeters). Otherwise, the inner ribs 124 have inner facing surfaces 140 spaced by a fifth distance $d_5$ and is 0.125 inches (0.32 cm) in one embodiment. In embodiments, there are 19 ribs 120/124/126.

These dimensions come with a tolerance of +/−0.010 inch (0.25 centimeter).

A ratio of $d_1$ to $d_2$ is between 0.90 and 1.00. A ratio of $d_1$ to $d_3$ is between 25 and 30. A ratio of $d_3$ to $d_4$ is between 0.60 and 0.70. A ratio of $d_3$ to $d_5$ is between 1.9 and 2.1.

The cooling channels 106 formed by the ribs provide cooling to the outer periphery of the stator and thus result in oil flow to provide adequate cooling.

A method of replacing a stator sleeve in an integrated drive generator includes the steps of removing an existing stator sleeve from an integrated drive generator having an input shaft connected to a gear differential. The gear differential includes a carrier shaft connected to a ring gear, which is connected to a main generator rotor. The main generator rotor is positioned within a main generator stator that includes a stator assembly, and the existing stator sleeve. The existing stator sleeve is replaced with a replacement stator sleeve having a body extending between a first end and a second end, and a having a generally cylindrical inner peripheral surface and an outer peripheral surface with a plurality of circumferentially extending ribs defining intermediate oil cooling channels.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A stator sleeve for use in an integrated drive generator comprising:
    a body extending between a first end and a second end, and having a generally cylindrical inner peripheral surface and an outer peripheral surface with a plurality of circumferentially extending ribs on said outer peripheral surface on defining intermediate oil cooling channels;
    wherein there is an end flange on said outer peripheral surface at said first end of said body, an end rib on said outer peripheral surface at said second end of said body, and a plurality of laterally intermediate ribs on said outer peripheral surface between said end flange and said end rib;
    wherein said inner peripheral surface having an inner diameter called a first distance, and an outer diameter to an outer peripheral surface of said end rib defining a second distance, and a ratio of said first distance to said second distance being greater than 0.90;
    wherein a third distance is defined between facing surgaces of said end flange and an intermediate rib most adjacent to said end flange, and a ratio of first distance to said third distance being between 25 and 30;
    wherein said end rib is spaced from a most adjacent one of said laterally intermediate ribs by a fourth distance, and a ratio of said third distance to said fourth distance being between 0.60 and 0.70;
    wherein a fifth distance is defined between at least two of said laterally intermediate ribs and a ratio of said third distance to said fifth distance being between 1.90 and 2.10; and
    wherein there are 19 of said laterally intermediate ribs.

2. The stator sleeve as set forth in claim 1, wherein said first distance being 6.940 inches (17.628 cm) and said second distance being 7.218 inches (18.334 cm), with both measurements having a tolerance of +/−0.10 inch (0.25 cm).

3. An integrated drive generator comprising:
    an input shaft connected to a gear differential, said gear differential including a carrier shaft connected to a ring gear, said ring gear connected to a main generator rotor, and said main generator rotor positioned within a main generator stator, said main generator stator including a stator assembly, and a stator sleeve, said stator sleeve having a body extending between a first end and a second end, and having a generally cylindrical inner peripheral surface and an outer peripheral surface with a plurality of circumferentially extending ribs defining intermediate oil cooling channels;
    wherein there is an end flange on said outer peripheral surface at said first end of said body, an end rib on said out peripheral surface at said second end of said body, with a plurality of laterally intermediate on said outer peripheral surface between said end flange and said end rib;
    wherein said inner peripheral surface having an inner diameter called a first distance, and an outer diameter to an outer peripheral surface of said end rib defining a second distance, and a ratio of said first distance to said second distance being greater than 0.90;
    wherein a third distance is defined between facing surfaces of said end flange and an intermediate rib most adjacent to said end flange, and a ratio of first distance to said third distance being between 25 and 30;
    wherein said end rib is spaced from a most adjacent one of said latterly intermediate ribs by a fourth distance, and a ratio of said third distance to said fourth distance is being between 0.60 and 0.70;
    wherein a fifth distance is defined between at least two of said laterally intermediate ribs and a ratio of said third distance to said fifth distance being between 1.90 and 2.10; and
    wherein there are 19 of said laterally intermediate ribs.

4. The integrated drive generator as set forth in claim 3, wherein said first distance being 6.940 inches (17.628 cm)

and said second distance being 7.218 inches (18.334 cm), with both measurements having a tolerance of +/−0.10 inch (0.25 cm).

\* \* \* \* \*